United States Patent
Klein et al.

(10) Patent No.: US 11,494,201 B1
(45) Date of Patent: Nov. 8, 2022

(54) SYSTEMS AND METHODS OF MIGRATING CLIENT INFORMATION

(71) Applicant: ADP, LLC, Roseland, NJ (US)

(72) Inventors: Eitan Klein, Saint James, NY (US); Jessica Anne Tatz, Denville, NJ (US); Mohammed Balal Ahmed, Jersey City, NJ (US); Jonathan Baier, Lovetsville, VA (US)

(73) Assignee: ADP, INC., Roseland, NJ (US)

( * ) Notice: Subject to any disclaimer, the term of this patent is extended or adjusted under 35 U.S.C. 154(b) by 0 days.

(21) Appl. No.: 17/325,581

(22) Filed: May 20, 2021

(51) Int. Cl.
| | |
|---|---|
| *G06F 9/44* | (2018.01) |
| *G06F 9/445* | (2018.01) |
| *G06Q 40/00* | (2012.01) |
| *G06F 40/279* | (2020.01) |
| *G06F 9/455* | (2018.01) |
| *G06F 9/54* | (2006.01) |
| *G06F 16/22* | (2019.01) |

(52) U.S. Cl.
CPC ........ *G06F 9/44521* (2013.01); *G06F 9/4552* (2013.01); *G06F 9/541* (2013.01); *G06F 16/2282* (2019.01); *G06F 40/279* (2020.01); *G06Q 40/125* (2013.12)

(58) Field of Classification Search
CPC .... G06F 9/44521; G06F 9/4552; G06F 9/541; G06F 16/2282; G06F 40/279
USPC .......................................... 716/162; 717/162
See application file for complete search history.

(56) References Cited

U.S. PATENT DOCUMENTS

| | | | | |
|---|---|---|---|---|
| 8,274,518 | B2* | 9/2012 | Blythe | G06T 15/005 |
| | | | | 345/522 |
| 9,292,328 | B2* | 3/2016 | Pratt | G06F 9/45545 |
| 10,109,027 | B1* | 10/2018 | Stack | G06Q 50/22 |
| 2002/0178208 | A1* | 11/2002 | Hutchison | G06F 9/52 |
| | | | | 718/103 |
| 2003/0018876 | A1* | 1/2003 | Zahir | G06F 12/1009 |
| | | | | 711/E12.059 |
| 2005/0210030 | A1* | 9/2005 | Gordon | G06F 16/9577 |
| 2007/0226714 | A1* | 9/2007 | Doi | G06F 9/45504 |
| | | | | 717/148 |
| 2008/0320012 | A1* | 12/2008 | Loving | G06F 16/213 |

(Continued)

FOREIGN PATENT DOCUMENTS

| | | | | |
|---|---|---|---|---|
| WO | 2004086268 | * | 10/2004 | G06Q 40/04 |
| WO | 2016023471 | * | 2/2016 | G06F 3/048 |

OTHER PUBLICATIONS

Binary stirring: Self-randomizing instruction addresses of legacy x86 binary code, Author: Ra Wartell et al, published on 2012.*

(Continued)

*Primary Examiner* — Chameli Das
(74) *Attorney, Agent, or Firm* — Alissa Pohlman; Andrew M. Calderon; Calderon Safran & Cole, P.C.

(57) ABSTRACT

The present disclosure relates to linking processing codes between platforms, and more particularly, to automatically record linking processing codes between platforms and methods of use. The method includes: obtaining a legacy processing code from a legacy system; obtaining a virtual code from a virtual entry table (VET) which corresponds with the legacy processing code; and mapping the legacy processing code to a target processing code using the virtual code from the VET.

20 Claims, 7 Drawing Sheets

(56) References Cited

U.S. PATENT DOCUMENTS

| | | | | |
|---|---|---|---|---|
| 2013/0144651 A1* | 6/2013 | Rao | ............... | G06Q 10/00 |
| | | | | 705/2 |
| 2013/0304531 A1* | 11/2013 | Barber | ............ | G06Q 10/06 |
| | | | | 705/7.12 |
| 2013/0329560 A1* | 12/2013 | Shomura | ......... | H04W 28/0247 |
| | | | | 370/235 |
| 2017/0269924 A1* | 9/2017 | Bansod | ............ | G06F 8/65 |
| 2020/0004690 A1* | 1/2020 | Mathew | ........... | G06F 12/0813 |
| 2021/0330241 A1* | 10/2021 | de Vries | .......... | A61B 5/4088 |

OTHER PUBLICATIONS

Title: Practical, dynamic information flow for virtual machines, author: V Haldar, published on 2005.*

Title: Welcome to the opportunities of binary translation, author: ER Altman.*

* cited by examiner

SYSTEMS AND METHODS OF MIGRATING CLIENT INFORMATION

TECHNICAL FIELD

The present disclosure relates to a system and method of linking or matching processing codes between platforms, and more particularly, to a system and method which automatically links and/or matches terminology between different platforms in order to migrate client data across different platforms.

BACKGROUND

Migrating information from one system to a contemporary, disparate system can be a complicated and costly process. Migration of data may include copying or rotating data to a different model. For example, many systems which are used to migrate data (e.g., client information) do not include the same processing codes (i.e., client factors, naming conventions) for the client information. In these cases, a user needs to manually select and match the processing codes from a legacy client to the contemporary system. In this scenario, the user needs to understand the processing codes from the client's legacy system and select the matching code for the new system. Mistakes are likely with any manual intervention and impact a level of client satisfaction.

With the above noted, in known systems, there is a problem in linking processing codes when migrating customer information between platforms. This process is similar for any value without a well-defined transformation function. During a setup, for example, definitions must be assigned to data of the customer information, but these definitions (e.g., processing codes) may be different amongst different systems. Accordingly, matching of the processing codes is either done manually or by using different types of algorithms that are lacking in depth and definition of the elements still making it difficult to link processing codes using the current method. Even using full string matching or "fuzzy matching" (i.e., fuzzy matching is based on similarity of text, as opposed to full string matching) could still be distant in the true meaning of an item for example "Deferred Compensation" has no matching to "403b" or "401k" even though we may know them to be the same.

SUMMARY

In a first aspect of the disclosure, a method includes: obtaining, by a computer program, a legacy processing code from a legacy system; obtaining, by the computer program, a virtual code from a virtual entry table (VET) which corresponds with the legacy processing code; and mapping, by the computer system, the legacy processing code to a target processing code using the virtual code from the VET.

In another aspect of the disclosure, there is a computer program product including one or more computer readable storage media having program instructions collectively stored on the one or more computer readable storage media, the program instructions executable to: obtaining a plurality of legacy processing codes from a legacy system; ranking each of the plurality of legacy processing codes into one of a low ranking, an intermediate ranking, and a high ranking based on usage of the legacy processing code over a predetermined period of time; obtaining a virtual code which corresponds with at least one legacy processing code that has the high ranking; and mapping the at least one legacy processing code that has the high ranking to a target processing code using the virtual code.

In a further aspect of the disclosure, there is a system, including: a processor, a computer readable memory, one or more computer readable storage media, and program instructions collectively stored on the one or more computer readable storage media, the program instructions executable to: obtain a legacy processing code which includes a plurality of words from a legacy system; and map the at least one legacy processing code that has the words to a target processing code. In particular, the at least one legacy processing code comprises a description of payroll information and the target processing code comprises a different description of a similar or same item to the payroll information.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION OF ASPECTS OF THE DISCLOSURE

The present disclosure relates to a system and method of linking or matching processing codes (i.e., legacy processing codes) between platforms, and more particularly, to a system and method which automatically links and/or matches terminology (of the processing codes) between different platforms in order to migrate client data across different platforms. In accordance with more specific aspects of the disclosure, a system, method and computer program product is provided that is capable of translating different types of codes, e.g., payroll processing codes, into multiple products for multiple platforms. For example, in embodiments, customer information can be translated, matched, and/or linked to target processing codes from one system to another system using tokenization, lemmatization/stemming, normalization, a virtual entry table (VET), and distance controlling between terms to improve matching reliability. The VET can also be enabled to bridge localization gaps. For example, the legacy processing codes can be in a first language, e.g., Hebrew, but the first software platform (e.g., Lifion, which is a cloud platform developed by ADP, LLC) can operate with existing system factors defined in a second language, e.g., English. Advantageously, it is now possible to automatically link and/or match different terminology or nomenclature (e.g., processing codes) between platforms, improving accuracy and matching reliability, reducing complexity, and further allowing a migration process to be accomplished by a single point of improvement.

Thus, the present disclosure can save time, expense, and latency by linking processing codes between platforms and improve customer satisfaction.

In embodiments, the system and/or method for linking or matching processing codes between platforms can be implemented in a computer program product or computing system as described in more detail herein. The system can improve matching of disparate nomenclatures (processing codes which define certain client information), perform a translation between different descriptions/translations (e.g., nomenclatures), rank terms according to their usage, while maintaining legacy processing codes (description/terminology). In more specific embodiments, the system can use tokenization, lemmatization/stemming, normalization, a virtual entry table (VET), and controlling a distance between terms to improve matching reliability as described in more detail herein.

Figure 1:
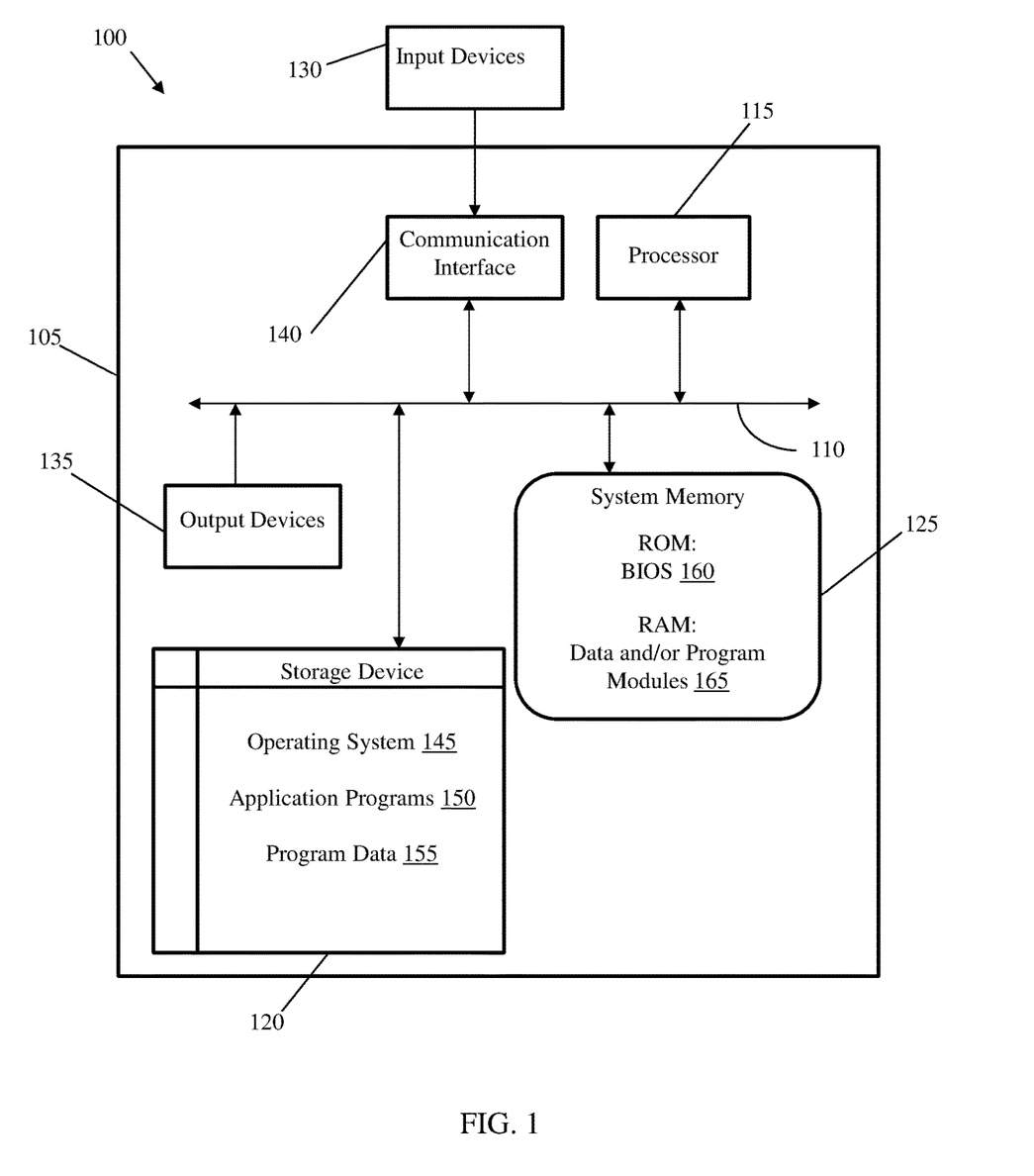
FIG. 1 is an illustrative architecture of a computing system implemented as embodiments of the present disclosure.

FIG. 1 is an illustrative architecture of a computing system 100 implemented as embodiments of the present disclosure. The computing system 100 is only one example of a suitable computing system and is not intended to suggest any limitation as to the scope of use or functionality of the present disclosure. As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions.

For example, processor 105 can gather (e.g., pull) data across a variety of sources (i.e., legacy systems) such as, e.g., employment data, income data, payroll data, personal data, as well as migration data (using, e.g., cellphone and satellite data) alongside data collection from a number of additional legacy systems. For example, the legacy systems can be SAP, Oracle, etc., which use different terminology or nomenclature than upgraded or different platforms. The processer 105 can collate such data and use it to link or match the processing codes (i.e., codes associated with different client information such as codes which define payroll information, e.g., deductions, withdrawals, etc.) between platforms, e.g., migrate customer information across platforms.

In embodiments, processor 115 may receive input signals from one or more input devices 130 and/or drive output signals through one or more output devices 135. The received input signals may be the data (received information) used by processor 115 to provide the functionality of the systems and methods described herein. The output devices 135 can be, for example, any display device, printer, audio speakers, etc.

In embodiments, processor 115 may be representative of a system (e.g., feed) which can collect and migrate customer information across platforms. For example, information such as, e.g., employment data, income data, payroll data, personal data, can be maintained in a first platform defined by a first type of nomenclature or terminology (e.g., processing code). This information can then be migrated to another platform which uses different nomenclature or terminology (e.g, processing code), using a single point of improvement. Accordingly, processor 115 can obtain the data from legacy suppliers, etc., and match this information to other platforms that implement different terminology or processing codes. This legacy processing codes can be used, translated, matched and/or linked to other platforms using techniques among different platforms using techniques such as tokenization, lemmatization/stemming, normalization, a virtual entry table (VET), and controlling a distance between terms to improve matching reliability as described in more detail herein.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as the input devices 130, mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to perform the tasks as described herein (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

Figure 2:
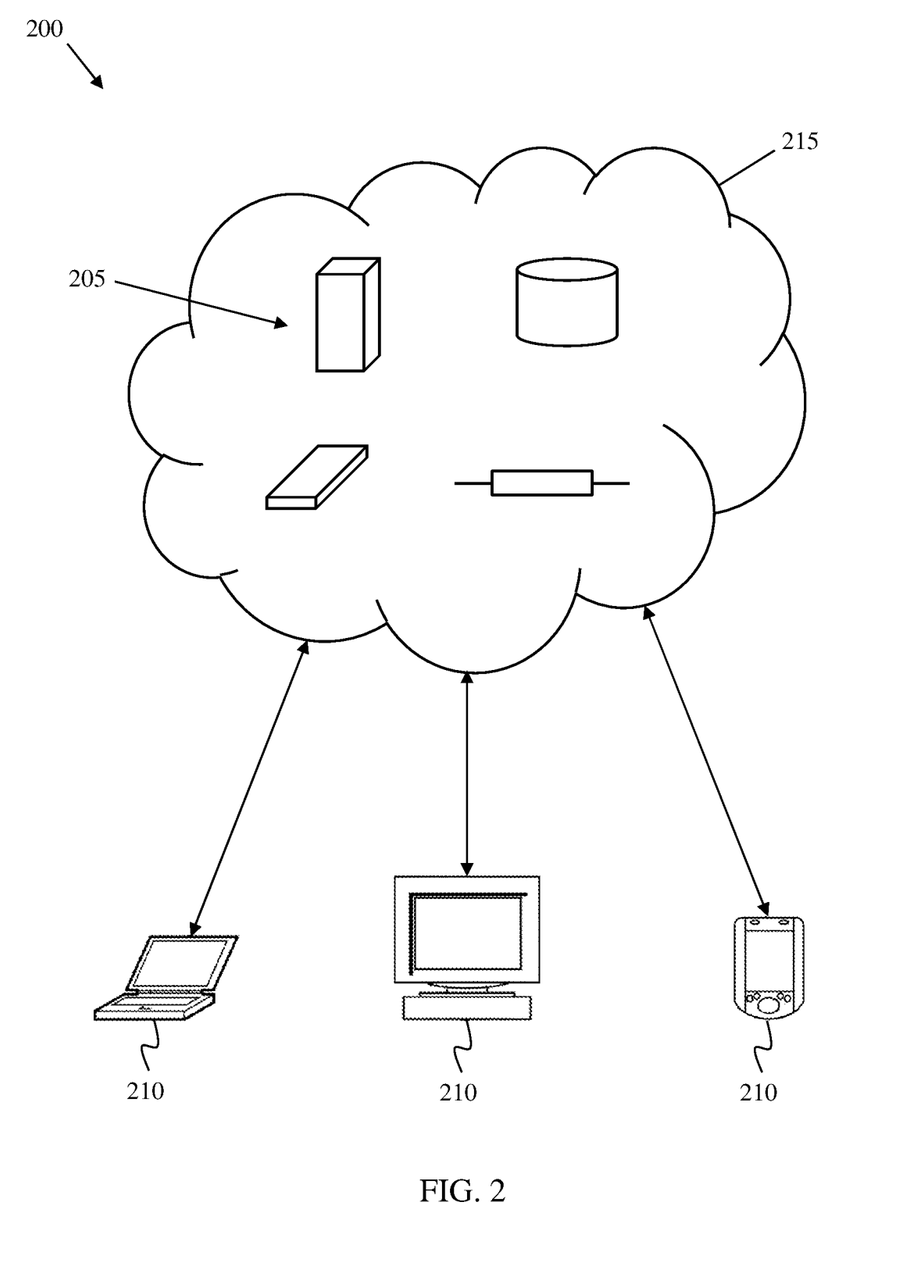
FIG. 2 shows an exemplary cloud computing environment in accordance with aspects of the disclosure.

FIG. 2 shows an exemplary cloud computing environment 200. Cloud computing enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, POS terminals, laptop computers, handheld computers (e.g., smartphones, tablet computers, cellular telephones), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
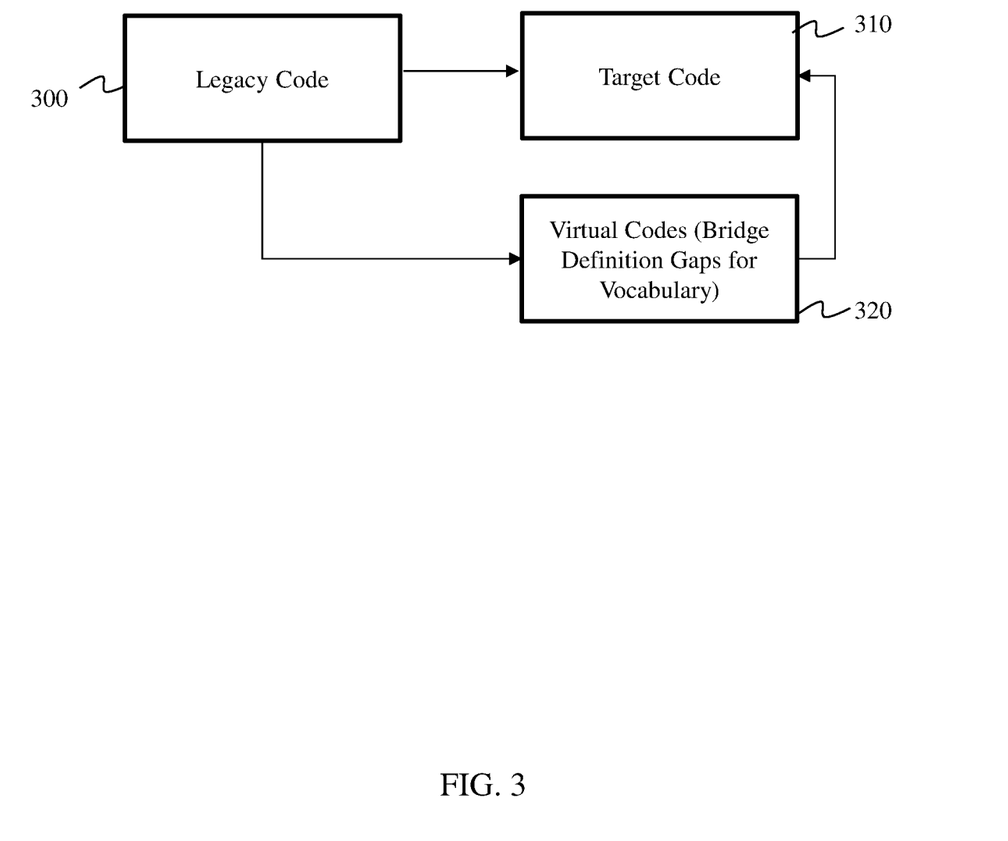
FIG. 3 depicts an exemplary flow for a virtual entry table (VET) matching versus a direct matching in accordance with aspects of the present disclosure.

FIG. 3 depicts an exemplary flow in accordance with aspects of the present disclosure. More specifically, the flow depicts a virtual entry table (VET) which provides matching and direct matching by indirection. The modules of the each of the exemplary flows described herein can be illustrative of a system, a method, and/or a computer program product and related functionality implemented on the computing system of FIG. 1. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing the flow of FIG. 3 (and other flows herein) can be downloaded to respective computing/processing devices, e.g., computing system of FIG. 1 as already described herein, or implemented on a cloud infrastructure as described with regard to FIG. 2. It should be understood that the steps of FIG. 3 (and other flows) can be provided in a different order.

At step 300, the system obtains information related to a legacy processing code (e.g., payroll information coded as "PROLL") from one or more sources, e.g., multiple feeds from a legacy system. As already described herein, the legacy processing code can be used to define certain information related to employment data, income data, payroll data, personal data, migration data, etc. At step 310, the system performs full text or fuzzy matching (i.e., direct matching) to a target processing code based on the nomenclature of the legacy processing code obtained in step 300. For example, fuzzy matching uses similarity of text terms between the legacy processing code and the target processing code; instead of full text matching. For example, "imputed income" as the legacy processing code can be matched to "imputed inc XX" as the target processing code using fuzzy matching based on similarity of the strings. Further, "STD" (i.e., short term disability deduction) as the legacy processing code can be matched to "Volun Ded XX" as the target processing code using normalization with VET mapping. By way of another example, "ROTH %" can be matched to "ROTH percentage" or "ROTH catch up %.

In an alternative path of FIG. 3, the legacy processing code may be mapped to the target processing code using virtual codes (i.e., indirect matching) found in a virtual entry table (VET) in step 320. The virtual codes in the VET will bridge definition gaps for a vocabulary of a different platform. For example, the virtual codes in the VET bridge definition gaps for platforms associated with a payroll company, e.g., ADP. In other words, the virtual code in the virtual entry table (VET) helps to connect or bridge gaps between a vocabulary/nomenclature of legacy processing code and a vocabulary/nomenclature of target processing code of platforms associated with the payroll company. In embodiments, the virtual codes may be generalized terms which point to the actual codes, e.g., the target processing code (i.e., maps to the target processing code) in step 310.

Moreover, in embodiments, the system may receive legacy processing codes from the legacy system and translate the legacy processing codes (i.e., source codes) to a more standardized term (i.e., virtual code) so that the legacy processing code can be mapped to a target processing code. The legacy processing codes from the legacy system can be a form of unstructured data with tokens, so there is no direct translation when translating the legacy processing codes to the target processing code. For example, a legacy processing code can be "supplies" which is matched to "REIMBURSE XXX" as a target processing code by normalizing a version of "supply" as a virtual code (i.e., which points to reimbursement). In this scenario, the virtual code "supplies" is a generalized term found in the virtual entry table (VET) for mapping the legacy processing code to the target processing code.

As described above, the virtual entry table (VET) has virtual codes/targets that enable funneling client terminology (i.e., legacy processing codes from legacy systems) to generic terminology (i.e., the virtual code). For example, if a client has a legal plan (i.e., the legacy processing code) and there is predefined generic term of legal (i.e., the virtual code), the system can use the virtual code to map the legacy processing code to a target processing code. For example, in the virtual entry table (VET), there can be a limited set of generic terminology (i.e., the virtual code) in a payroll domain, such as legal plan, severance, voluntary deduction, earning, etc. In accordance with the present disclosure, matching reliability can also be improved by controlling the distance between terms to enable highly selective text. In other words, controlling the distance can amplify a portion of the code. Controlling the distance can be done by increasing a hamming distance. Further, an algorithm such as edit distance can be used for increasing a delta in the hamming distance. For example, if "ROTH %" can be presented in memory as "ROTH percentage" by increasing the distance of percentage, this eliminates possible matches to ROTH catchup.

In another example, the legacy processing code (i.e., source code) can be "referral bonus". As the virtual code in the VET is "bonus", matching reliability can be improved by controlling the distance between the terms "referral" and "bonus". In this scenario, the impact/distance of "referral" in the legacy processing code may be reduced and the impact/distance of "bonus" may be increased (i.e., increasing the distance or impact of the term "bonus" with respect to "referral"). After the distance is controlled between "referral" and "bonus", the system may map the legacy processing code of "referral bonus" to the target processing code of "bonus" because the impact/distance of "bonus" is increased relative to the term "referral".

Moreover and still referring to FIG. 3, the system for linking and/or matching processing codes between platforms can also use tokenization, lemmatization/stemming, normalization, and controlling a distance between terms to improve matching reliability in addition to the virtual entry table (VET). In particular, tokenization can break a text string into a plurality of sections and lemmatization/stemming can remove extra characters. Normalization can adjust terms to a similar form, e.g., "adj" can be transformed to "adjustment", "juryd" to juryduty", "reimb" to "reimbursement", etc. Illustratively, the example of "imputed income" of a first platform can be matched to "imputed inc xx" of a second platform using an edit distance algorithm.

Figure 4:
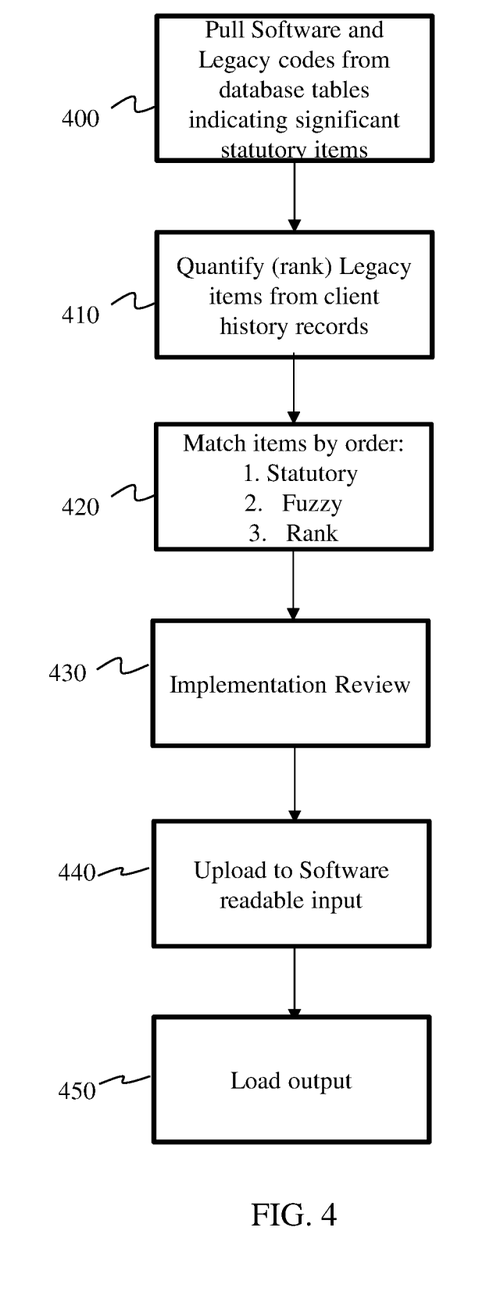
FIG. 4 depicts an exemplary flow for a migration process in accordance with aspects of the present disclosure.

FIG. 4 depicts an exemplary flow for a migration process in accordance with aspects of the present disclosure. At step 400, first software platform processing codes (e.g., human resources (HR) software processing codes) and legacy processing codes are pulled from data tables which indicate significant statutory items. In embodiments, the first software platform can be Lifion, which is a cloud platform developed by ADP, LLC. Statutory items are descriptions of the first software platform processing codes and legacy processing codes from the data tables.

In step 410, legacy items (i.e., information corresponding to the legacy processing codes) from client history records (i.e., legacy history records) are quantitatively ranked. For example, if the legacy items are determined to be used by the client (i.e., legacy) at a predetermined high frequency or greater (e.g., actively used often over the past year or actively used often over a predetermined period), then the legacy item is highly ranked. In contrast, if the legacy items are determined to be used by the client at a predetermined low frequency or lower (e.g., not actively used that many times over the past year or not actively used that many times over the predetermined period), then the legacy item is lowly ranked. If a frequency of the legacy items cannot be determined, then the legacy item receives an intermediate rank. In an embodiment, if the legacy item is lowly ranked, the migration process may not occur or occur less frequently than with intermediate or high rankings.

In step 420, the legacy items are matched to the target processing code according to one of the following as non-limiting illustrative examples: 1) statutory description; 2) fuzzy text matching; and 3) the ranking in step 410. Then, the implementation of the matching of the legacy items to the target processing code is reviewed in step 430. After the implementation is reviewed, the readable input of the matching to the target processing code is uploaded to first software platform in step 440. At step 450, the output is loaded to Lifion in step 450.

Figure 5A:
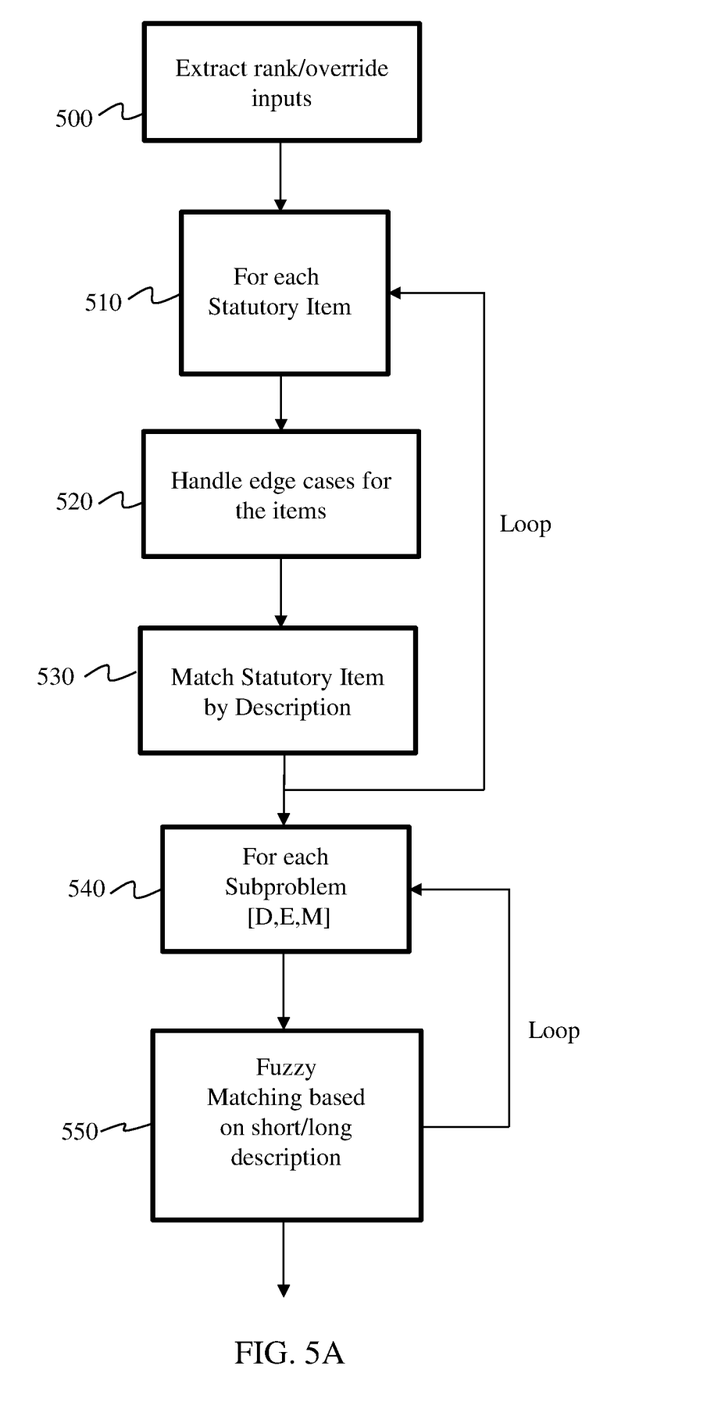
FIGS. 5A and 5B depicts an exemplary flow for a matching process in accordance with aspects of the present disclosure.
Figure 5B:
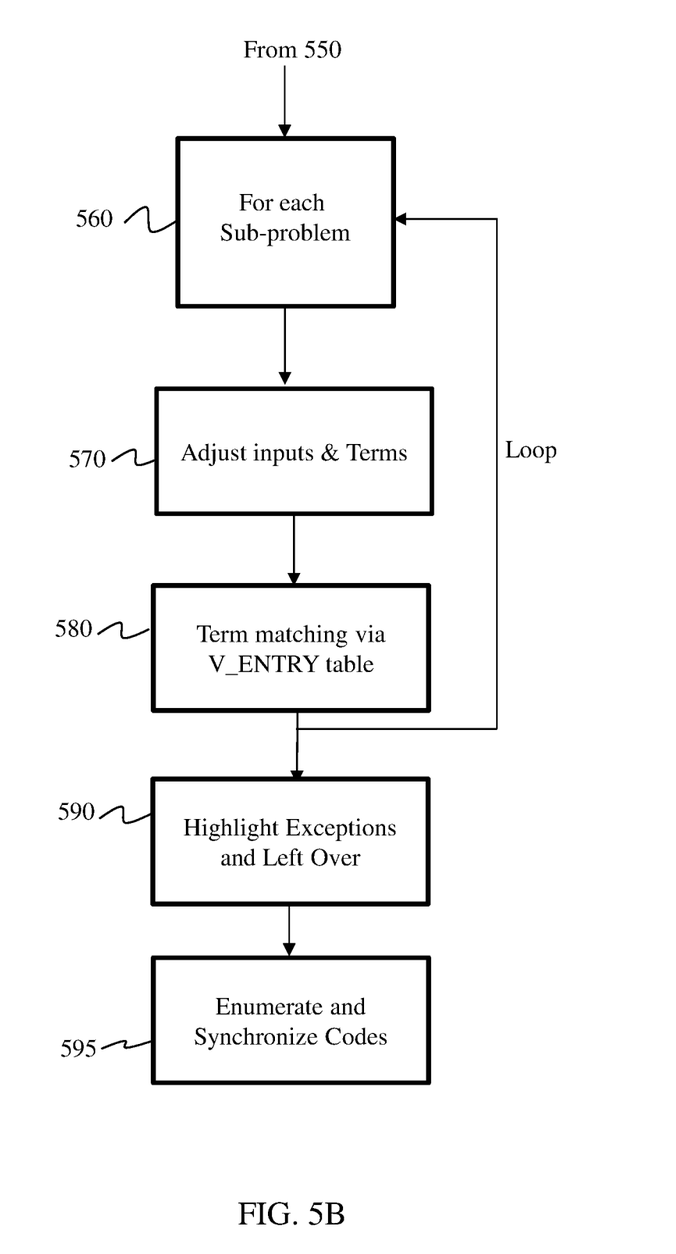

FIGS. 5A and 5B depict an exemplary flow for a matching process in accordance with aspects of the present disclosure. In FIG. 5A, at step 500, ranking/override inputs are extracted (e.g., rankings from step 410). For example, a high ranking for a legacy item can represent an override input with respect to a low ranking for another legacy item. In other words, a legacy item with a high ranking may override another legacy item with a low ranking (i.e., the another legacy item with the low ranking may not be used).

At step 510, for each statutory item, edge cases are handled in step 520 and statutory items are matched by description in step 530. Edge cases are situations that occur only at extreme (e.g., maximum or minimum) operating parameters of the, e.g., statutory items. As shown in FIG. 5A, steps 510-530 are looped for each statutory item. For example, a statutory item can be a job performance bonus.

After all of the statutory items are looped in steps 510-530, for each sub-problem (i.e., deductions D, earnings E, and memo M) of the statutory items in step 540, fuzzy matching can be performed based on the short and/or long description of each statutory item for each sub-problem in step 550. For example, a short description can be "bonus" and a long description can be "performance bonus" for a statutory item (e.g., "job performance bonus") in the earnings E sub-problem. In steps 540 and 550, the automatic fuzzy matching strives for better parity with human on existing software code. As shown in FIG. 5A, steps 540 and 550 are looped for each sub-problem (D, E, M). For example, if it is determined that the source code is a deduction D, the fuzzy matching is performed such that the range of the target processing code is reduced to only deductions for the enumeration process (see step 595 below). Further, the present disclosure can also match code by type used once, and paired correctly to increase quality control. For example, deduction amount can be matched to correct deduction %.

In FIG. 5B, after step 550, for each sub-problem (i.e., deductions D, earnings E, and memo M) in step 560, inputs and terms are adjusted for each item in step 570 and term matching occurs via the virtual entry (i.e., V_ENTRY) table for each item in step 580. In particular, each item may be "term" matched to the target processing code via the virtual entry V_ENTRY (e.g., virtual code found in the virtual entry V_ENTRY of the virtual entry table (VET). The virtual code in the VET bridge definition gaps for a vocabulary of a different platform. In other words, the virtual code in the virtual entry table (VET) helps to connect or bridge gaps between a vocabulary/nomenclature of legacy items and a vocabulary/nomenclature of target processing code of the first software platform. As shown in FIG. 5B, steps 560-580 are looped for each sub-problem (D, E, M). In step 590, exceptions and left over items are highlighted. In step 595, target processing codes are enumerated and synchronized for each item. Also, in step 595, harmonization of codes are also contemplated herein, e.g., utilize code from a range from 1 to N.

Figure 6:
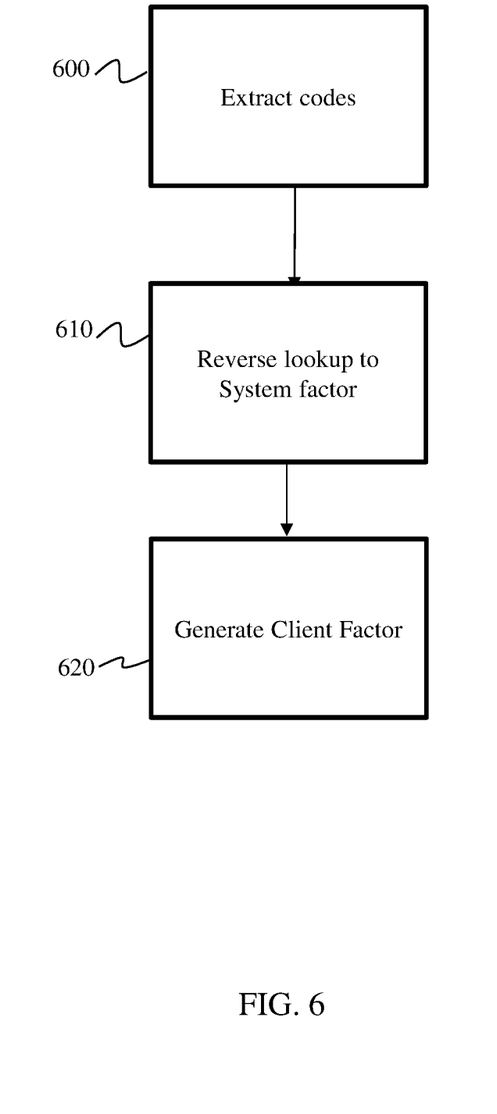
FIG. 6 depicts an exemplary flow for a reverse approach in accordance with aspects of the present disclosure.

FIG. 6 depicts an exemplary flow for a reverse approach in accordance with aspects of the present disclosure. In FIG. 6, at step 600, autopay codes, as one illustrative example, are extracted from the first software platform. For example, an autopay code may indicate whether the item is a deduction, earning, etc. In step 610, a reverse lookup is performed to map the autopay code to a system factor (i.e., execution code). In step 620, the system factor is used to generate a client factor which is a human readable description of processing codes for the first software platform. In other words, the client factor is a description which corresponds to the legacy processing codes. Therefore, the system of the present disclosure can ensure that first software platform is compatible with the legacy processing codes from legacy systems. For example, legacy processing code such as "vaccine bonus" (e.g., "vaccine bonus" can be a client description upload) can continue to be used in the first software platform and printed on a payroll/paycheck report regardless of whether the source code has been mapped to the target processing code.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method, comprising:

obtaining, by a computer system, a legacy processing code from a legacy system;

ranking, by the computer system, the legacy processing code into one of a low ranking, an intermediate ranking, and a high ranking based on usage of the legacy processing code over a predetermined period of time;

obtaining, by the computer system, a virtual code from a virtual entry table (VET) which corresponds with the legacy processing code that has the high ranking; and mapping, by the computer system, the legacy processing code that has the high ranking to a target processing code using the virtual code from the VET, wherein the virtual code is a generalized and standardized term of the legacy processing code that has the high ranking and which points to the target processing code by bridging a gap between a nomenclature of the legacy processing code that has the high ranking and a nomenclature of the target processing code to automatically link different nomenclatures across different platforms.

2. The method of claim 1, wherein the legacy processing code comprises a description of payroll information and the target processing code comprises a different description of a similar or same item to the payroll information.

3. The method of claim 1, wherein the virtual code is the generalized and standardized term of the legacy processing code that has the high ranking for mapping the legacy processing code that has the high ranking to the target processing code.

4. The method of claim 1, further comprising breaking a text string of the legacy processing code that has the high ranking into a plurality of legacy processing code sections for obtaining the virtual code from the VET.

5. The method of claim 1, further comprising adjusting a text string of the legacy processing code that has the high ranking into a similar form of the text string for obtaining the virtual code from the VET.

6. The method of claim 1, further comprising removing characters of a text string of the legacy processing code that has the high ranking for obtaining the virtual code from the VET.

7. The method of claim 1, wherein the legacy processing code that has the high ranking comprises a plurality of words.

8. The method of claim 7, further comprising controlling a distance of at least one word of the words such that the distance of the at least one word is changed in comparison to remaining words of the words for obtaining the virtual code from the VET.

9. The method of claim 8, wherein the distance of the at least one word of the words is increased in comparison to the remaining words of the words.

10. The method of claim 8, wherein the distance of the at least one word of the words is decreased in comparison to the remaining words of the words.

11. The method of claim 1, wherein the legacy processing code receives the intermediate ranking in response to a frequency of the legacy processing code being undetermined, and controlling a distance of at least one word of the legacy processing code by increasing a delta in a hamming distance using an algorithm.

12. A computer program product comprising one or more non-transitory computer readable storage media having program instructions collectively stored on the one or more computer readable storage media, the program instructions executable to:

obtaining a plurality of legacy processing codes from a legacy system;

ranking each of the plurality of legacy processing codes into one of a low ranking, an intermediate ranking, and a high ranking based on usage of the legacy processing code over a predetermined period of time;

obtaining a virtual code which corresponds with at least one legacy processing code that has the high ranking; and mapping the at least one legacy processing code that has the high ranking to a target processing code using the virtual code, wherein the virtual code is a generalized and standardized term of the legacy processing code that has the high ranking and which points to the target processing code by bridging a gap between a nomenclature of the legacy processing code that has the high ranking and a nomenclature of the target processing code to automatically link different nomenclatures across different platforms.

13. The computer program product of claim 12, wherein each of the legacy processing codes comprises a description of payroll information and the virtual code is obtained from a virtual entry table (VET).

14. The computer program product of claim 12, wherein the virtual code is the generalized and standardized term which corresponds with the at least one legacy processing code that has the high ranking.

15. The computer program product of claim 12, further comprising breaking a Text string of the at least one legacy processing code that has the high ranking into a plurality of legacy processing code sections.

16. The computer program product of claim 12, further comprising adjusting a text string of the at least one legacy processing code that has the high ranking into a similar form of the text string.

17. The computer program product of claim 12, further comprising removing characters of a text string of the at least one legacy processing code that has the high ranking.

18. The computer program product of claim 12, wherein the at least one legacy processing code that has the high ranking comprises a plurality of words.

19. A system, comprising:

a processor, a computer readable memory, one or more non-transitory computer readable storage media, and program instructions collectively stored on the one or more computer readable storage media, the program instructions executable to:

obtain at least one legacy processing code with a plurality of words from a legacy system;

rank each of the at least one legacy processing code that has the words into one of a low ranking, an intermediate ranking, and a high ranking based on usage of the at least one legacy processing code over a predetermined period of time;

obtain a virtual code which corresponds with the at least one legacy processing code for mapping the legacy processing code that has the high ranking to the target processing code; and map the at least one legacy processing code that has the words and the high ranking to a target processing code using the virtual code, wherein the at least one legacy processing code comprises a description of payroll information and the target processing code comprises a different description of a similar or same item to the payroll information, and the virtual code is a generalized and standardized term of the at least one legacy processing code and which points to the target processing code by bridging a gap between a nomenclature of the at least one legacy processing code and a nomenclature of the target processing code to automatically link different nomenclatures across different platforms.

20. The system of claim 19,
wherein the virtual code is obtained from a virtual entry table (VET).

* * * * *